3,514,213
GAS TURBINE ENGINE SHROUD SUPPORT
Thomas R. Stockton, Ann Arbor, Mich., assignor to Ford Motor Company, Dearborn, Mich., a corporation of Delaware
Filed Sept. 26, 1968, Ser. No. 762,931
Int. Cl. F01d 25/28
U.S. Cl. 415—198         7 Claims

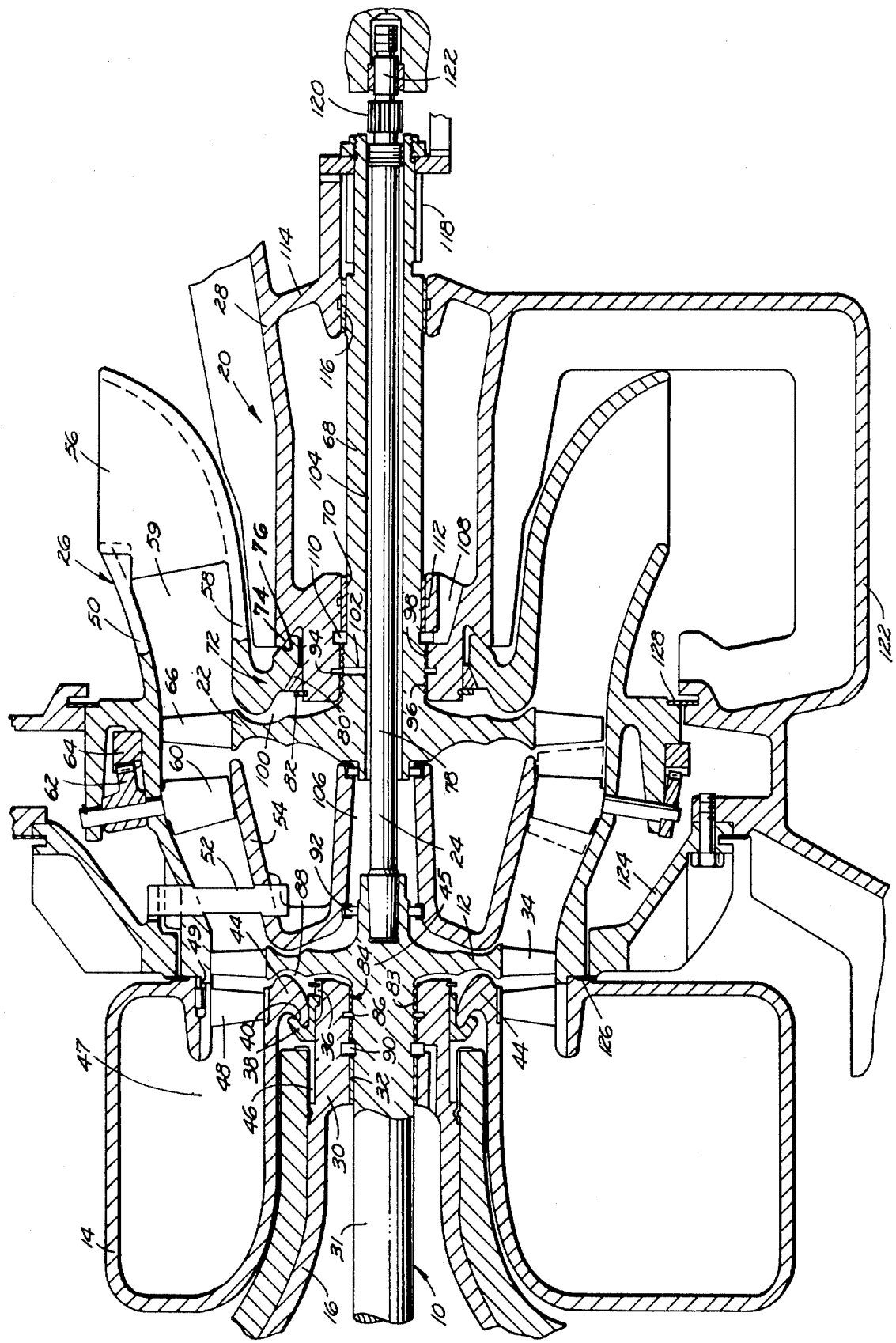

ABSTRACT OF THE DISCLOSURE

The entire stationary turbine shroud assembly consisting of radially spaced inner and outer interconnected shrouds and the combustor plenum is supported only at its ends on pivotal joints so that as the rotor supports flex, all elements move as a unit thereby maintaining the same relative running clearance therebetween as initially provided.

---

This invention relates, in general, to an automotive type gas turbine engine. More particularly, it relates to the support of the stationary shroud assembly of a gas turbine engine.

Prior art gas turbine engines of the automotive type have a stationary turbine shroud assembly consisting of inner and outer radially spaced shrouds defining a motive fluid flow path. The assembly generally is supported from the center bulk head of the engine housing, and also generally at both ends. This is disadvantageous, however, because of the restraint that the bulk head provides when the compressor and power turbine support members flex during operation of the engine. During this latter time, the shroud assembly as well as the turbine wheels move relative to one another. This necessitates additional running clearance between the tip of the rotating turbine blades and the stationary shroud structure to compensate or allow for the growth described. This, of course, decreases engine efficiency by providing a greater leakage path between the top of the blades and the shroud assembly.

The invention relates to a gas turbine engine having a turbine shroud assembly that is supported only at the ends, and on pivotal joints. That is, the entire stationary turbine shroud structure, including the combustor plenum, is essentially a rigid structure that flexes with the compressor turbine and power turbine support members during operation of the engine. There is no restraint from the center bulk head portion of the main housing since all of the support for the shroud structure is provided by pivotal joints at opposite ends of the structure. Accordingly, when the compressor turbine and power turbine supports flex, all of the members, the compressor and power turbines and stationary shroud assembly move together. This, therefore, permits the elimination of the usual additional running clearance between the turbine rotor blades and the shroud assembly. Also, the pivotal joints maintain concentricity under thermal expansion conditions.

Accordingly, it is a primary object of the invention to provide a gas turbine engine with a shroud assembly that is supported essentially only at its ends by pivotal connections to the compressor turbine and power turbine support members.

Other objects, features and advantages of the invention will become more apparent upon reference to the succeeding detailed description thereof, and to the drawings illustrating a preferred embodiment thereof, wherein the single figure shows a cross-sectional view of a portion of a gas turbine engine embodying the invention.

The figure illustrates essentially the central portion of an automotive type gas turbine engine. It includes a rear portion 10 of the gasifier section including the compressor turbine 12 and the combustor plenum 14, the two being separated by the compressor turbine support member 16. Also shown is the power turbine section 20 including the power turbine rotor or wheel 22 rotatably surrounding an accessory drive shaft 24 driven by the compressor turbine 12, and the stationary turbine shroud assembly 26 separated from the power turbine by the power turbine support member 28.

More specifically, that portion of the gasifier section shown includes a stationary conically shaped support member 16. The latter has a hub 30 that rotatably supports the compressor turbine shaft 31 on a sleeve bearing 32. The compressor shaft is formed integral with a compressor turbine rotor 12, the latter having a row or annular series of blades 34 extending radially outwardly therefrom, as shown.

The radially outer portion of hub 30 is axially slidably splined at 36 to the inner ring-like half 38 of a pivotal joint. The inner peripheral surface of joint portion 38 has a spherical surface 40 for cooperation with the matingly shaped spherical surface 42 formed on the inner contoured end 44 of the combustor plenum 14. The two joint portions together have a pivot about a point on the axis of the compressor turbine, and more specifically, at the point of intersection 45 of the plane of rotation of the compressor turbine and a plane at right angles thereto. A spring 46, between the support hub 30 and joint member 38, continuously loads the joint surfaces rearwardly and together.

The plenum 14, as shown, is a diminishing volute chamber. It discharges the products of combustion from the engine combustion chamber or can, not shown, through an annular opening 47 past a number of turbine inlet guide nozzle vanes 48 that redirect the flow against the compressor turbine blades 34. As shown, the plenum has an offset stop portion 49 secured to the left-hand end of the stationary annular shroud assembly 26 to form a rigid structure therewith.

The shroud assembly consists of a one piece outer annular shroud 50 joined by a number of circumferentially spaced streamlined pins 52 to a first part 54 of an inner annular shroud, and by a number of circumferentially spaced pilot joint struts 56 to a second part 58 of the annular inner shroud. The two shroud portions together form an annular path 59 for the flow of motive fluid therethrough in a known manner.

Outer shroud 50 rotatably supports a series or row of pivotally mounted power turbine inlet nozzle vanes 60. The latter are connected by segment gear portions 62 to a ring gear member 64, the latter being rotated, by means not shown, at times to rotate blades 60 to various operational positions, in a known manner.

The turbine nozzle vanes or blades 60 cooperate in a known manner with the row of power turbine blades 66 to control rotation of the latter. The turbine blades are fixedly secured to the power turbine wheel 22 formed on the power turbine shaft 68. The power turbine is rotatably mounted within a conically shaped support member 28 on an annular sleeve bearing 70, as shown. Shaft 68 is hollow and rotatably receives therein the accessory drive shaft 24 fixedly secured to and driven by compressor turbine 12.

The power turbine support 28 provides a pivotal connection 72 of the outermost portion of its hub 73 with the inner shroud of shroud assembly 26, in a manner similar to the front end support. Both the inner shroud end and the power turbine support member are formed with matingly shaped spherical surfaces 74 and 76. The latter provide a pivotal connection between the surfaces for movement about a point on the axis of the power turbine, and more specifically, at the intersection 78 between the plane of rotation of the power turbine and a plane at right angles thereto. The figure indicates a washer 80 abutting the shroud assembly joint portion axially located by a snap ring 82. However, the washer may be eliminated if desired, as the gas loadings and the force of front spring 46 continually loads the shroud assembly against the support members in a sealing manner.

Turning now to the sealing and cooling of the parts, the compressor turbine shaft 31 is formed with an axially fluted portion 83 that cooperates with the radially inner portion of hub 30 to provide a labyrintian passage therebetween. Hub 30 also is provided with an air supply duct 86 that is connected to the compressor discharge air, by means not shown. The turbine inlet nozzle vanes 48 cause a pressure drop thereacross that causes the pressure of the fluid in the space 88 between the compressor turbine, plenum and turbine support to be less than the compressor discharge pressure, or at say, 35 p.s.i. gauge pressure, for example. Accordingly, the air in passage 86 being higher pressure will pressurize the labyrinthian passage axially outwardly from passage 86 so that air flow maintains the hot motive gases away from the bearing 32.

Hub 30 also is provided with an oil drain passage 90. The outward air flow from the labyrintian passage causes the oil in drain 90 to flow past bearing 32. Therefore, air supply passage 86 not only seals the bearing from the hot gases, but cools the surfaces as well since the compressor discharge air is at a lower temperature than the gases exiting from the combustor plenum.

Proceeding downstream from compressor turbine, the inner stationary turbine shroud 54 is shown as supported on the hubs of the compressor and power turbines by a pair of annular carbon ring seals 92 permitting relative rotation between the parts.

Continuing rightwardly, the hub of the rear turbine conical support member 28 likewise is formed with a cooling air passage 94 that pressurizes outwardly a labyrinthian passage 96. The latter is defined by an axially fluted portion 98 on the power turbine shaft cooperating with the hub of support 28. The passage 94 maintains the hot motive fluid in channel 100 away from the hub of the power turbine, and also cools the bearing member 70. In addition, the cooling air passage 94 cooperates with a bore 102 in the turbine shaft 68 and the annular space 104 between the turbine shaft and the accessory drive shaft 24 for the flow of cooling air in the direction of the arrows 106 radially outwardly to insulate the inner portions against the hot motive gases. The rear turbine support member 28 is also provided with an oil drain passage 108 connected to an annular drain 110 adjacent bearing 70. An oil feed 112 is also provided for lubrication of the bearing surface.

The power turbine support member 28 has a rear portion 114 that rotatably supports the rear portion of the power turbine shaft 68, as shown, on an annular bearing surface 116. The latter also axially locates the turbine shaft for concentricity. Formed on the rear of the turbine shaft 68 is a power take-off sun gear 118 which provides the input to the conventional reduction gearing, not shown. In a similar manner, the accessory drive shaft has a gear member 120 formed thereon.

The conical compressor and power turbine support members 16 and 28 are secured in a manner not shown to the front and rear portion of the main housing of the gas turbine engine, which includes a center portion or bulkhead 122. Secured to and extending radially inwardly of this housing portion 122 is a conical sealing ring 124 that extends adjacent the inner shroud assembly but does not provide any support therefor. A high pressure seal consisting of a metallic ring 126 seals the atmospheric pressure area outwardly of the shroud assembly from the higher pressure, hotter area adjacent the plenum to prevent the hot gases communicating with the area around the power turbine nozzle actuator mechanism 62. Similarly, at the opposite end of this latter area, is a low pressure seal ring 128 to seal the hotter higher pressure (2 p.s.i. gauge for example) fluid in the exhaust area against entering the power turbine nozzle actuator area, which is at zero gauge or atmospheric pressure.

In operation, when the engine is shutd own, spring 46 will load the spherical joint portion surface 40 rearwardly against the plenum chamber portion surface 42 and urge the plenum against the shroud assembly 26. This urges the rear portion of the shroud assembly against the power turbine support member 28 via the spherical joint 72 so that the passages are sealed during starting conditions. As soon as the engine is operating, the pressure differential existing both axially and radially across the compressor turbine inlet nozzle vanes 48 takes over the axial loading of the parts from spring 46 and thereafter continues to maintain the joint portions against one another.

During operation, when either or both of the compressor turbine support 16 or the power turbine 28 flex, the spherical joints 40, 42 and 72 cause pivoting of the entire structure as a unit at opposite ends about the points 45 and 78. Thus, the turbine rotor, the compressor turbine support, and the plenum all move as a unit so that the radial tip clearance between the compressor rotor blades 34 and the shroud assembly 26 remain essentially the same as before. Concentricity of the parts also is maintained.

As a result, the initial clearance between the blades and outer shroud can be reduced to a minimum, which raises the efficiency of the engine to a high value as compared to other constructions in which allowance for additional running clearance must be made since the prior structure does not move together upon flexing of the housing support members. This unitary movement, of course, is permitted by the invention because of the supporting of the entire rigid shroud assembly only at its ends on pivotal joints with no restraints being placed on the shroud assembly by the housing center bulk head, as is the case in the known prior art constructions.

From the foregoing, therefore, it will be seen that the invention provides a gas turbine engine shroud assembly that is supported only at its ends on pivotal joints in a manner such that flexing of the engine housing portions causes the rotatable and stationary portions to flex together and thereby maintain essentially the same relative running clearance at all times between the compressor and power turbine blades and their respective shroud members.

While the invention has been illustrated in its preferred embodiment in the drawings, it will be clear to those skilled in the arts to which it pertains that many changes and modifications may be made thereto without departing from the scope of the invention.

For example, while the invention has been described as having spherical surfaces for the pivotal joints, it will be clear that conically mating surfaces could be used without departing from the scope of the invention.

I claim:
1. A shroud support for use in a gas turbine engine having axially aligned and spaced rotary compressor and power turbines each containing blades radially outwardly thereof, and a stationary coaxially mounted shroud assembly consisting of inner and outer annular joined shroud members radially spaced to define a motive fluid flow path therebetween into which said blades project to be rotated by the flow of said motive fluid thereagainst, said shroud support including a stationary sleeve housing at opposite ends of said shroud assembly rotatably mounting said turbines therewithin, and joint means at each end of said assembly directionally locating and mounting the ends of said shroud assembly for a pivotal movement on the respective sleeve housings.

2. A shroud support as in claim 1, said joint means comprising the sole support for said assembly.

3. A shroud support as in claim 1, said joint means including mating conical bearing surfaces on said housings and cooperating assembly ends.

4. A shroud support as in claim 1, said joint means including mating spherical bearing surfaces on said housings and cooperating assembly ends.

5. A shroud support as in claim 1, each of said joint means mounting said assembly for pivotal movement about a point on the axis of said engine.

6. A shroud support as in claim 1, said joint means connecting said housings and assembly and turbines for movement together upon movement of said housings whereby the running clearance between the blades and the outer shroud remains essentially the same regardless of the flexing of the parts is minimized.

7. A support as in claim 1, one of said joint means including spring means biasing said assembly and housing sleeves together in a sealing manner.

References Cited

UNITED STATES PATENTS

| | | |
|---|---|---|
| 2,960,306 | 11/1960 | Collman et al. |
| 3,043,559 | 7/1962 | Bauer et al. |
| 3,078,071 | 2/1963 | Henny et al. |
| 3,358,440 | 12/1967 | Freid. |

EVERETTE A. POWELL, JR., Primary Examiner

415—219